(12) United States Patent
Kim et al.

(10) Patent No.: US 7,041,155 B1
(45) Date of Patent: May 9, 2006

(54) SELECTIVE ADSORBENT FOR NITROGEN AND METHOD FOR SEPARATING AIR USING THE SAME

(75) Inventors: Jin-Bae Kim, Sakai (JP); Hisanao Jo, Sakai (JP); Haruo Yoshioka, Sakai (JP); Hiromi Kiyama, Sakai (JP)

(73) Assignee: Air Water, Inc., Sapporo (JP)

( * ) Notice: Subject to any disclaimer, the term of this patent is extended or adjusted under 35 U.S.C. 154(b) by 0 days.

(21) Appl. No.: 10/257,382

(22) PCT Filed: Apr. 20, 2000

(86) PCT No.: PCT/JP00/02606

§ 371 (c)(1),
(2), (4) Date: Oct. 18, 2002

(87) PCT Pub. No.: WO01/80991

PCT Pub. Date: Nov. 1, 2001

(51) Int. Cl.
*B01D 53/04* (2006.01)

(52) U.S. Cl. .............................. 95/130; 95/902; 502/79
(58) Field of Classification Search ............ 95/130, 95/902; 502/79
See application file for complete search history.

(56) References Cited

U.S. PATENT DOCUMENTS

| | | | | |
|---|---|---|---|---|
| 3,488,146 A | * | 1/1970 | Reid, Jr. ..................... | 502/79 |
| 3,607,043 A | * | 9/1971 | McDaniel et al. .......... | 423/700 |
| 4,859,217 A | | 8/1989 | Chao | |
| 5,152,813 A | | 10/1992 | Coe et al. | |
| 5,174,979 A | | 12/1992 | Chao et al. | |
| 5,258,060 A | * | 11/1993 | Gaffney et al. ............... | 95/101 |
| 5,268,023 A | * | 12/1993 | Kirner .......................... | 95/103 |
| 5,464,467 A | * | 11/1995 | Fitch et al. .................... | 95/98 |
| 5,576,258 A | * | 11/1996 | Chamberlain et al. ........ | 502/73 |
| 5,868,818 A | * | 2/1999 | Ogawa et al. ................. | 95/96 |
| 5,916,836 A | | 6/1999 | Toufar et al. | |
| 5,919,287 A | * | 7/1999 | Moreau ....................... | 95/130 |
| 5,932,509 A | * | 8/1999 | Balse et al. ................... | 502/65 |
| 5,962,358 A | * | 10/1999 | Hees et al. .................... | 502/67 |
| 6,407,025 B1 | * | 6/2002 | Brandt et al. ................. | 502/65 |
| 6,464,756 B1 | * | 10/2002 | Plee .............................. | 95/96 |
| 6,514,317 B1 | * | 2/2003 | Hirano et al. ................. | 95/96 |
| 6,537,348 B1 | * | 3/2003 | Hirano et al. ................. | 95/96 |
| 2001/0021368 A1 | * | 9/2001 | Masini et al. ............... | 423/700 |

FOREIGN PATENT DOCUMENTS

| | | |
|---|---|---|
| EP | 0850877 | 7/1998 |
| EP | 0893157 | 1/1999 |
| JP | 10-118485 | 5/1998 |
| JP | 10-128106 | 5/1998 |
| JP | 11-009990 | 1/1999 |
| JP | 2000-202281 | 7/2000 |

\* cited by examiner

*Primary Examiner*—Robert H. Spitzer
(74) *Attorney, Agent, or Firm*—Armstrong, Kratz, Quintos, Hanson & Brooks, LLP (57) ABSTRACT

A nitrogen selective adsorbent comprises a zeolite of a faujasite crystalline structure containing $Li^+$ and at least one of $NH^+$ and $H^+$ as essential cations, and has a nitrogen adsorption characteristic represented by specific correlation between the number of associated $Li^+$ ions per unit lattice of a zeolite crystal and the amount of adsorbed nitrogen per unit lattice of the zeolite crystal. An air separation method employs the aforesaid nitrogen selective adsorbent for separation between nitrogen and oxygen by selective adsorption of nitrogen in air.

4 Claims, 8 Drawing Sheets

ID OF NITROGEN
SELECTIVE ADSORBENT FOR NITROGEN AND METHOD FOR SEPARATING AIR USING THE SAME

TECHNICAL FIELD

The present invention relates to a nitrogen selective adsorbent to be used for selectively adsorbing nitrogen in nitrogen-containing gas such as air, and an air separation method using the same.

BACKGROUND ART

One method for selective adsorptive separation of nitrogen from nitrogen-containing gas is a pressure swing (PSA) method. The PSA method employs an adsorbent such as a zeolite, and achieves adsorptive separation between nitrogen and oxygen by repeating a cycle which comprises the steps of separating oxygen from a nitrogen/oxygen gas mixture such as air by selectively adsorbing highly polar nitrogen on the adsorbent under an increased pressure, desorbing nitrogen from the adsorbent under a reduced pressure, and regenerating the adsorbent.

It is known that the zeolite employed in the PSA method has a polar component adsorption capacity which varies depending on the type of associated cations in the zeolite, and an adsorption amount increases as the charge density of the cations increases (Literature 1: H. Minato and Watanabe, Sci. Pap. Coll. Gen. Educ. Univ. Tokyo 28, p.215–220 (1978)). The number of the cations in the zeolite corresponds to Al in the skeleton of the zeolite. Therefore, a zeolite having a greater number of Al atoms is more advantageous because a greater number of cations serving as adsorption sites are present therein. Further, an adsorption amount and diffusion rates during the adsorption and the desorption are increased, as the diameters and volumes of pores in the crystalline structure of the zeolite are increased.

From this viewpoint, an A-zeolite (MS5A) and an X-zeolite of faujasite structure (CaX) which are ion-exchanged with Ca are conventionally employed as adsorbents for oxygen production PSA on an industrial basis.

It has recently been found that an x-zeolite ion-exchanged with lithium ions, particularly a low-silica X-zeolite (LSX), has a much higher capacity than the conventional MS5A and Cax, and such an X-zeolite has been put into practical use as an adsorbent for oxygen production PSA (Literature 2: U.S. Pat. No. 4,859,217 and Japanese Examined Patent Publication No. HEI5-25527) Further, effective use of divalent cations in combination with the lithium ions for the ion exchange has also been patented (Literature 3: U.S. Pat. No. 5,152,813 and Japanese Examined Patent Publication No. HEI7-57300).

However, a lithium source for the ion exchange is more expensive than other cation components, and the ion exchange is very difficult. More specifically, the $Li^+$-LSX is typically prepared by exchanging monovalent cations ($Na^+$, $K^+$) in a $Na^+$-LSX or a $Na^+.K^+$-LSX with lithium ions. As can be understood from an ion-exchange isotherm observed when sodium ions of the $Na^+$-X-zeolite were exchanged with lithium ions (Literature 4: H. S. Sherry, J. Phys. Chem. 70 (1966), 1158), for example, the lithium ion exchange of the X-zeolite is difficult. Where an X-zeolite containing lithium ions in a proportion of not smaller than 80% is prepared by exchanging sodium ions of the $Na^+$-LSX with lithium ions, lithium is required in an amount at least 4 to 15 times the amount of the lithium ions taken into the zeolite.

Literature 2 states that the lithium ions should be contained in a proportion of 88% or more with a $SiO_2/Al_2O_3$ ratio of 2.0 to 2.5 to ensure a high nitrogen adsorption capacity. Further, Literature 3 states that, where the $Na^+$-LSX is ion-exchanged into the $Li^+$-LSX, the nitrogen adsorption capacity is kept virtually unchanged until the content of the lithium ions reaches about 67%, but the nitrogen adsorption capacity is remarkably improved after the content of the lithium ions exceeds 67%.

To provide an adsorbent having a high nitrogen selective adsorption capacity, the ion exchange with lithium ions intrinsically having a lower exchange efficiency should be caused to proceed to a higher extent and, therefore, a great amount of the expensive lithium source is consumed, resulting in higher costs. For practical application to the oxygen production PSA, it is essential to improve the lithium ion exchange efficiency and to reduce the lithium ion association ratio while maintaining a high adsorption capacity.

In view of the foregoing, it is an object of the present invention to provide a nitrogen selective adsorbent having a high nitrogen selective adsorption capacity even with a lower lithium ion exchange ratio than the conventional adsorbent, and to provide an air separation method.

DISCLOSURE OF THE INVENTION

In accordance with a first aspect of the present invention to achieve the aforesaid object, there is provided a nitrogen selective adsorbent, which comprises a zeolite of a faujasite crystalline structure containing lithium ions and at least one kind of cations selected from ammonium ions and protons as essential cations, and has a nitrogen adsorption characteristic represented by the following expression (1) at 760 Torrs at 20° C.:

$$y_1 = ax + b \qquad (1)$$

wherein $y_1$ is the amount of adsorbed nitrogen per unit lattice of a zeolite crystal, x is the number of associated $Li^+$ ions per unit lattice of the zeolite crystal, a is a variable calculated from the following equation:

$$a = a' - 0.2 \times \sqrt{z} \text{ (wherein } a' \text{ is 0.30 to 0.40),}$$

b is a variable calculated from the following equation:

$$b = b' + 19.2 \times \sqrt{z} \text{ (wherein } b' \text{ is } -19.6 \text{ to } -15.1\text{), and}$$

$$z \text{ is } z = \frac{\text{Number of moles of } H^+}{\text{Total number of moles of cations other than } Li^+}$$

(wherein z is 0.3 to 1.0).

In accordance with a second aspect of the present invention, the nitrogen selective adsorbent has a nitrogen-oxygen separation characteristic represented by the following expression (2) at 760 Torrs at 20° C.:

$$y_2 = cx + b \qquad (2)$$

wherein $y_2$ is a factor indicative of a nitrogen-oxygen separation efficiency and calculated from the following equation on the basis of measurement of adsorption of nitrogen and oxygen at 760 Torrs at 20° C.:

$$y_2 = \frac{N_{N2} \times Y_{O2}}{N_{O2} \times Y_{N2}}$$

(wherein $N_{N2}$ is the amount of $N_2$ adsorbed at a partial pressure (608 Torrs) of nitrogen in air, $N_{O2}$ is the amount of $O_2$ adsorbed at a partial pressure (152 Torrs) of oxygen in air, $Y_{N2}$ is a molar fraction (0.8) of nitrogen in air, and $Y_{O6}$ is a molar fraction (0.2) of oxygen in air), x is the number of associated $Li^+$ ions per unit lattice of the zeolite crystal, C is a variable calculated from the following equation:

$c=c'-0.071 \times \sqrt{z}$ (wherein $c'$ is 0.105 to 0.115), d is a variable calculated from the following equation:

$d=d'+6.816 \times \sqrt{z}$ (wherein $d'$ is −5.06 to −2.96), and z is $z = \frac{\text{Number of moles of } H^+}{\text{Total number of moles of cations other than } Li^+}$ (wherein z is 0.3 to 1.0).

In accordance with a third aspect of the present invention, there is provided an air separation method for separating nitrogen and oxygen, the method comprising: bringing air into contact with the aforesaid nitrogen selective adsorbent; and selectively adsorbing nitrogen in the air on the adsorbent.

The inventors of the present invention have found that a nitrogen selective adsorbent prepared by ion-exchanging a sodium ion- or potassium ion-associated zeolite with ammonium ions ($NH_6^+$) and then with lithium ions or by ion-exchanging a sodium ion- or potassium ion-associated zeolite with lithium ions and ammonium ions simultaneously has a higher nitrogen selective adsorption capacity than the conventional adsorbent even with a reduced lithium ion association ratio, and attained the present invention. The conventional nitrogen selective adsorbent fails to have a notable adsorption capacity unless the lithium ion association ratio exceeds about 67%. On the other hand, the nitrogen selective adsorbent according to the present invention, which contains at least one type of cations selected from ammonium ions and protons in addition to lithium ions with a reduced amount of sodium ions and potassium ions, has a sufficiently high nitrogen adsorption capacity even with a low lithium ion association ratio. The air separation method employing the aforesaid nitrogen selective adsorbent ensures highly efficient air separation at low costs, because the nitrogen selective adsorbent has a sufficiently high nitrogen adsorption capacity even with a low lithium ion association ratio.

BEST MODE FOR CARRYING OUT THE INVENTION

Embodiments of the present invention will hereinafter be described in detail.

The nitrogen selective adsorbent according to the present invention is employed for selective adsorptive separation of nitrogen from nitrogen-containing gas. A typical example of the nitrogen-containing gas is air. In this case, the adsorbent is typically employed for adsorptive separation of nitrogen from air for production of oxygen. The adsorbent is employed for separation of nitrogen from a gas mixture containing nitrogen and oxygen, argon, helium, neon or hydrogen.

The nitrogen selective adsorbent according to the present invention is produced, for example, in the following manner. First, a crystalline x-zeolite of a faujasite structure is prepared which contains at least one type of ions selected from sodium ions and potassium ions.

The zeolite preferably has a $SiO_2/Al_2O_3$ ratio of smaller than 3.0. Particularly, a low-silica X-zeolite (LSX) having a $SiO_2/Al_2O_3$ ratio of about 2.0 is preferably employed.

The LSX ($SiO_2/Al_2O_3$ ratio=2.0) is taken as an example for explaining in detail a method for preparing the zeolite as a starting material in the present invention. First, ingredients including sodium hydroxide, potassium hydroxide, water, a sodium aluminate solution and a sodium silicate solution are blended in the following composition ratios for preparation of an LSX precursor in a gel form.

| Composition | |
|---|---|
| $SiO_2/Al_2O_3$: | 1.5 to 3.0 |
| $(Na_2O + K_2O)/Al_2O_3$: | 4.5 to 7.3 |
| $K_2O/(Na_2O + K_2O)$: | 0.2 to 0.4 |
| $H_2O/SiO_2$: | 50 to 70 |

Sodium hydroxide, potassium hydroxide, water, the sodium aluminate solution and the sodium silicate solution are blended in this order, and the sodium silicate solution is added with vigorous stirring. The resulting mixture is continuously stirred for a while, whereby the Si source and the Al source react with each other to provide a gelled solid product and a reaction temperature rises to about 40° C. At this time, a seed crystal may be added for acceleration of homogeneous crystallization of the product. The seed crystal is an LSX prepared by a known method and having a specific surface area of 700 $m^2/g$ and a $SiO_2/Al_2O_3$ of 2.0, and is added in a proportion of about 0.1 to about 0.5 wt % based on the weight of the gelled product. After the mixing of all the ingredients is completed, the stirring is continued for about 10 minutes or longer until the product is homogeneously gelled. The gel thus obtained is transferred into a Teflon or stainless container, and allowed to stand in a constant temperature bath at 40° C. or 60° C. for 24 to 120 hours for maturation thereof and then at a temperature of 60 to 100° C. for 0 to 24 hours for completion of the crystallization thereof. The resulting product is washed with deionized water on a filter until the pH of the filtrate becomes not higher than 10. Then, the product is dried in a drier at 100° C. over night. Thus, crystalline $Na^+.K^+$-LSX powder is prepared.

The crystalline LSX powder thus prepared may be used as the adsorbent in a powder form or in a tablet form. In general, a binder such as colloidal silica (e.g., CATALOID 30 available from Catalysts & Chemicals Industries Co., Ltd.) or clay such as kaolin is added to the crystalline LSX powder, and the resulting mixture is granulated into a pellet or bead form. To prevent the adsorption capacity of the adsorbent per unit weight from being reduced due to the addition of the binder, the resulting granules may be immersed in an alkaline solution and heated for a predetermined period for zeolization of the binder component. By the zeolization of the binder, the bander is almost perfectly converted into a zeolite, though it depends on the type of the binder and the conditions for the zeolization in the alkaline solution. In the case of the X-zeolite, particularly in the case of the LSX, an A-zeolite is liable to occur in a very small amount by the zeolization of the binder. This may result in slight reduction of the adsorption capacity of the granules as compared with the crystalline powder before the granulation. However, the A-zeolite occurs in a proportion of not higher than about 10%, so that the granules containing the A-zeolite exhibit adsorption characteristics according to the present invention without any problem.

The inventive nitrogen selective adsorbent is produced by employing the zeolite as the starting material. For example, the zeolite is first ion-exchanged with ammonium ions, and then with lithium ions.

The ion exchange with ammonium ions is achieved, for example, in the following manner. The zeolite as the starting material is immersed still in a 2N ammonium nitrate aqueous solution (mother solution ratio of about 15) at 80° C. for two hours, and this operation is repeated plural times (e.g., once to five times). At this time, it is preferred to add aqueous ammonia to the ammonium nitrate aqueous solution to adjust the pH of the ammonium nitrate aqueous solution at about 9.0 in weak alkalinity. Thus, a zeolite whose monovalent cations such as sodium ions are exchanged with ammonium ions is obtained (which is herein called "intermediate exchanged product" in distinction from the starting zeolite). The term "mother solution ratio" herein means the ratio of the number of ions in the solution employed for the ion exchange to the number of ion-exchange sites of the zeolite.

The aforesaid intermediate exchanged product is ion-exchanged with lithium ions, for example, in the following manner. Lithium nitrate or lithium chloride is employed as a lithium source. The lithium ion exchange is performed with the use of an aqueous solution of the lithium source. At this time, it is preferred to add lithium hydroxide to the aqueous solution of the lithium source to adjust the pH of the aqueous solution at about 9.0 in weak alkalinity. This is because the crystalline structure of the X-zeolite is liable to be destroyed where the aqueous solution employed for the ion exchange is acidic irrespective of the presence or absence of the lithium ions. The concentration of the lithium aqueous solution exerts no particular influence but, if the concentration is too low, a great amount of the lithium aqueous solution is required. On the other hand, if the concentration is high, the consumption of the expensive Li source is increased. Therefore, an about 1N to about 3N solution is preferably used for the ion exchange.

A flow-type ion exchange method in which the lithium aqueous solution is caused to continuously flow through an ion exchange reaction tower filled with the zeolite is more efficient than a batch ion exchange method. On a laboratory scale, however, it is difficult to employ the flow-type method, so that a relatively low concentration lithium aqueous solution (1N lithium nitrate aqueous solution) is preferably employed in a mother solution ratio of about 0.4 to about 5. For further enhancement of the lithium ion exchange ratio, it is preferred to repeatedly use the solution in a mother solution ratio of 5.

As compared with the conventional sodium ion- or potassium ion-associated zeolite, the intermediate exchanged product (ammonium ion-associated zeolite) has an increased ion exchange ratio even if a lithium solution having the same mother solution ratio is employed. Thus, the lithium ion exchange efficiency is notably improved. In addition, the nitrogen selective adsorbent prepared from the intermediate exchanged product has an excellent nitrogen selective adsorption capacity even with a relatively low lithium ion association ratio.

In the lithium ion-associated zeolite prepared by the aforesaid production method, the sodium ions and the like associated with the starting material and the ammonium ions associated with the intermediate exchanged product partly remain as cations associated with a zeolite skeleton in addition to the lithium ions. However, when the zeolite is heated at 300° C. or higher, the ammonium ions are dissociated into ammonium (NH,) and protons ($H^+$), and the protons remain in the zeolite. Where the lithium ion-associated zeolite is employed as the adsorbent, the zeolite is heated at about 400° C. for removal of water adsorbed on the zeolite. Therefore, most of the ammonium ions in the zeolite are supposedly converted into protons.

Where the intermediate exchanged product subjected to the ammonium ion exchange is further ion-exchanged with lithium ions by the aforesaid production method, the lithium ion exchange efficiency can more effectively be improved by first converting the ammonium ions into protons and then exchanging the protons with lithium ions. In the case of the LSX, however, the thermal destruction of the zeolite crystalline structure is exaggerated, as the ammonium ion exchange ratio is increased. Therefore, it is more preferred that the intermediate exchanged product is subjected to the lithium ion exchange in a wet state without heating and drying after the ammonium ion exchange. Further, rinsing the intermediate exchanged product with pure water is also effective for preventing unnecessary ions from remaining before the lithium ion exchange. For the improvement of the lithium ion exchange efficiency, it is preferred to provide the intermediate exchanged product by thus exchanging 70 to 100% of the sodium ions and the potassium ions with ammonium ions.

In the present invention, it is preferred in terms of the nitrogen selective adsorption characteristic to reduce as much as possible the proportion of cations such as sodium ions and potassium ions other than lithium ions in the $Li^+$-associated zeolite finally obtained. Particularly, it is more effective to reduce the proportion of the sodium ions and the potassium ions to lower than 10%.

To obtain the final product free from sodium ions and potassium ions, the following three exemplary methods are conceivable. A first method is such that 100% lithium ion exchange is performed and then some of the lithium ions are exchanged with ammonium ions. A second method is such that the lithium ion exchange and the ammonium ion exchange are simultaneously performed by employing a solution containing lithium ions and ammonium ions. A third method is such that the ammonium ion exchange is repeated a plurality of times to perfectly exchange sodium ions with ammonium ions so as not to allow the sodium ions to remain. The second method may be applied not only to preparation of the intermediate exchanged product from the starting zeolite but also to preparation of the intermediate exchanged product ion-exchanged with ammonium ions to some extent.

In the first method, the $Li^+.H^+$-LSX can easily be prepared. However, the reduction of the consumption of the lithium source cannot be expected, requiring the recovery of the lithium source. The second method is advantageous in that the intended $Li^+.H^+$-LSK can be prepared by a single ion exchange operation and the consumption of the lithium source can be reduced by an amount corresponding to the amount of the ammonium ions added to the ion exchange solution. The third method is the most promising method for the reduction of the consumption of the lithium source. Since the sodium ions are not present in waste liquid after the lithium ion exchange, the recovery of the lithium ions is considered to be easy. However, the crystalline structure of the LSX is liable to be destroyed by the ammonium ion exchange. As described above, the inventers of the present invention know that the destruction of the crystalline structure does not proceed in a wet state after the ammonium ion exchange. Therefore, the $Li^+.H^+$-LSX free from sodium ions can be prepared by performing the lithium ion exchange without drying the aforesaid intermediate exchanged product.

The inventive nitrogen selective adsorbent thus prepared has an unprecedentedly excellent nitrogen selective adsorption capacity, which is represented by the following expression (1) at 760 Torrs at 20° C:

$$y_1 = ax + b \quad (1)$$

wherein $y_1$ is the amount of adsorbed nitrogen per unit lattice of the zeolite crystal, x is the number of associated $Li^+$ ions per unit lattice of the zeolite crystal, a is a variable calculated from the following equation:

$$a = a' - 0.2 \times \sqrt{z} \text{ (wherein } a' \text{ is 0.30 to 0.40)},$$

b is a variable calculated from the following equation:

$$b = b' + 19.2 \times \sqrt{z} \text{ (wherein } b' \text{ is } -19.6 \text{ to } -15.1), \text{ and}$$

$$z \text{ is } z = \frac{\text{Number of moles of } H^+}{\text{Total number of moles of cations other than } Li^+}$$

(wherein z is 0.3 to 1.0).

The above expression (1) is obtained in the following manner. The unit lattice of the faujasite-type zeolite completely dehydrated is represented by a molecular formula of $M_{(96-x)/y}[Al_{(96-x)}Si_{(96+x)}O_{384}]$, wherein M is an exchangeable cation and y is a valence number. Therefore, the number of contained monovalent cations is equal to the number of Al atoms (y=1), and the number of contained divalent cations is half the number of Al atoms (y=2). Further, the number of trivalent cations is one third the number of Al atoms (y=3). The nitrogen adsorption capacity of the faujasite-type zeolite is determined through measurement by variably setting the lithium ion exchange ratio. By plotting the obtained data, it was found that the nitrogen adsorption capacity depends on a Li/Al ratio This is also stated in Literature 2 described above. In Literature 5 (Yoshida et al, Proceedings of the 13th Zeolite Meeting, p.145, 1997), it is reported that, where a relationship between the lithium ion exchange ratio and the nitrogen adsorption amount is expressed by plotting the number of lithium ions per unit lattice versus the number of adsorbed nitrogen molecules per unit lattice, the relationship is linear irrespective of the Si/Al ratio when the number of the lithium ions per unit lattice is not smaller than 64.

Figure 1:
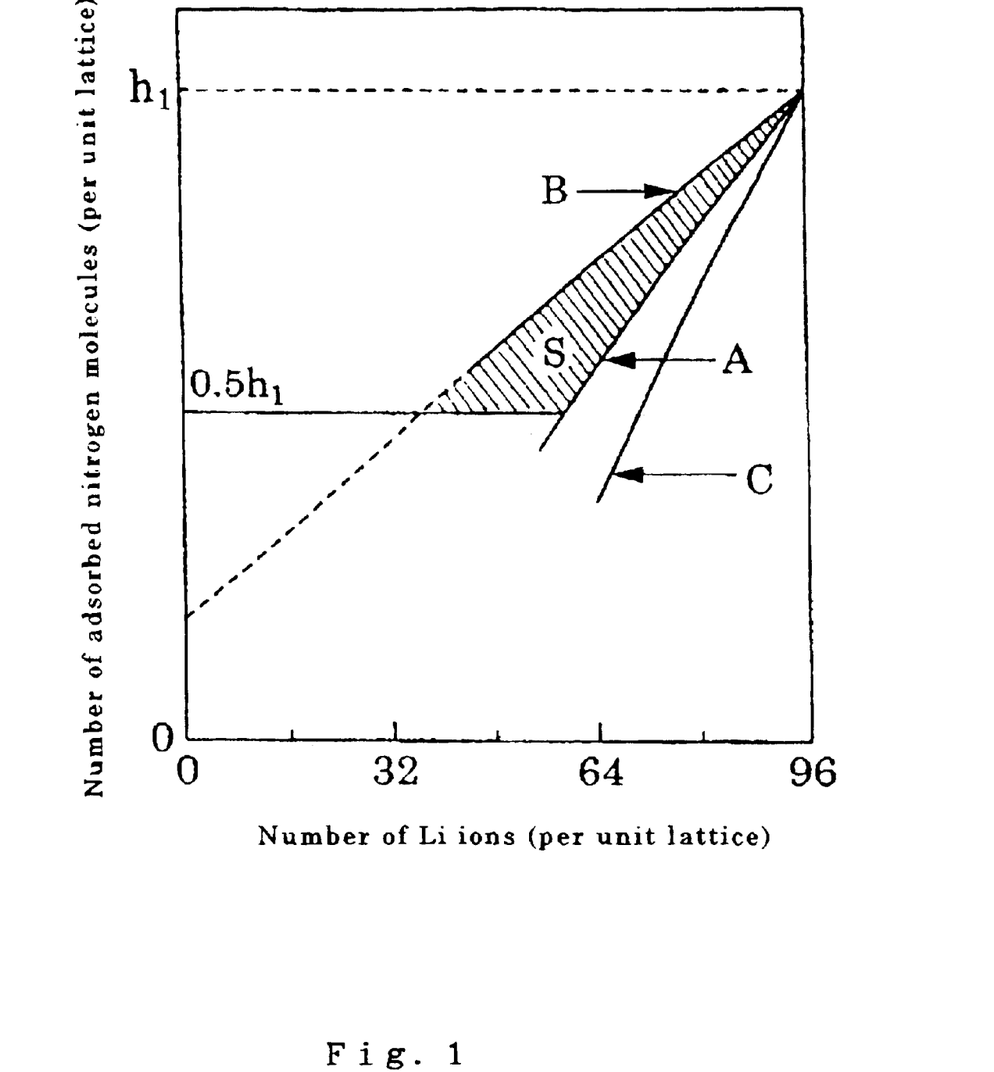
FIG. 1 is a diagram illustrating a nitrogen adsorption characteristic of a nitrogen selective adsorbent according to the present invention.

The inventors of the present invention examined the adsorption characteristics of samples according to the present invention at 760 Torrs at 20° C. by plotting the number of lithium ions per unit lattice and the number of adsorbed nitrogen molecules per unit lattice as abscissa and ordinate, respectively, and found that all the resulting lines are inconsistent with a characteristic line for the conventional $Li^+.Na^+$-LSX but belong to a hatched region S in FIG. 1. The set of lines belonging to the region S are approximated to be comprehensively represented by the expression (1). A reference character $h_1$ is the number (maximum number) of adsorbed nitrogen molecules observed when the number of lithium ions per unit lattice is 96 (when the 100% lithium exchange is performed), and the lines passing through this point have different inclinations depending on the type and proportion of the exchanged cations. A line A represents a lower limit of the nitrogen adsorption characteristic in the present invention, wherein z=0.3. A line B represents an upper limit of the nitrogen adsorption characteristic in the present invention, wherein z=1.0. A line C represents the adsorption characteristic of the conventional $Li^{30}.Na^+$-zeolite free from $H^+$, wherein z=0.

In FIG. 1, the above expression (1) is generally effective only when $y_1$ is from $0.5 h_1$ to $h_1$. When $y_1$ is lower than $0.5 h_1$, the adsorption characteristic does not fit along a line having a predetermined inclination, because the faujasite crystalline structure is destroyed during a heat activation process performed after the ion exchange. Therefore, the application of the above expression (1) is preferably limited to the range of $y_1 = 0.5 h_1$ to $h_1$.

In the expression (1), the ranges of the constants employed when the zeolite is used in a powder form and when the zeolite is used in a pellet form are different from each other, depending on the extent of the reduction of the amount of the binder employed for the pelletization, the crystallinity of the zeolite and the presence of the A-zeolite, as described above. More specifically, the constant b' is from −16.1 to −15.1 when the zeolite is used in a power form, and is from −19.6 to −15.6 when the zeolite is used in a pellet form (with an A-zeolite content of smaller than 10%).

The inventive nitrogen selective adsorbent is preferably excellent not only in nitrogen adsorption characteristic but also in nitrogen-oxygen separation efficiency. The nitrogen selective adsorbent preferably has a separation factor represented by the following expression (2):

$$y_2 = cx + d \quad (2)$$

wherein $y_1$ is a factor indicative of a nitrogen-oxygen separation efficiency and calculated from the following equation on the basis of measurement of adsorption of nitrogen and oxygen at 760 Torrs at 20° C.:

$$y_2 = \frac{N_{N2} \times Y_{O2}}{N_{O2} \times Y_{N2}}$$

(wherein $N_{N2}$ is the amount of $N_2$ adsorbed at a partial pressure (608 Torrs) of nitrogen in air, $N_{O2}$ is the amount of $O_2$ adsorbed at a partial pressure (152 Torrs) of oxygen in air, $Y_{N2}$ is a molar fraction (0.8) of nitrogen in air, and $Y_{O2}$ is a molar fraction (0.2) of oxygen in air), x is the number of associated Li$^+$ ions per unit lattice of the zeolite crystal.

c is a variable calculated from the following equation:

$$c = c' - 0.071 \times \sqrt{x} \text{ (wherein } c' \text{ is 0.105 to 0.115)},$$

d is a variable calculated from the following equation:

$$d = d' + 6.816 \times \sqrt{z} \text{ (wherein } d' \text{ is } -5.06 \text{ to } -2.96\text{), and}$$

$$z \text{ is } z = \frac{\text{Number of moles of H}^+}{\text{Total number of moles of cations other than Li}^+}$$

(wherein z is 0.3 to 1.0).

The above expression (2) is obtained in the following manner. The adsorption characteristics of samples according to the present invention at 760 Torrs at 20° C. were examined by plotting the number of lithium ions per unit lattice and the nitrogen-oxygen separation factor as abscissa and ordinate, respectively, and it was found that the relationship between the number of lithium ions per unit lattice and the nitrogen-oxygen separation factor is linear and all the resulting lines are inconsistent with a characteristic line for the conventional Li$^+$.Na$^+$-LSX but belong to a hatched region T in FIG. 1. The set of lines belonging to the region T are approximated to be comprehensively represented by the above expression (2). A reference character h$_2$ is the separation factor (maximum value) observed when the number of lithium ions per unit lattice is 96 (when the 100% lithium exchange is performed), and the lines passing through this point have different inclinations depending on the type and proportion of the exchanged cations A line A' represents a lower limit of the separation characteristic in the present invention, wherein z=0.3. A line B' represents an upper limit of the separation characteristic in the present invention, wherein z=1.0. A line C' represents the adsorption characteristic of the conventional Li$^+$.Na$^+$-zeolite free from H$^+$, wherein z=0.

Figure 2:
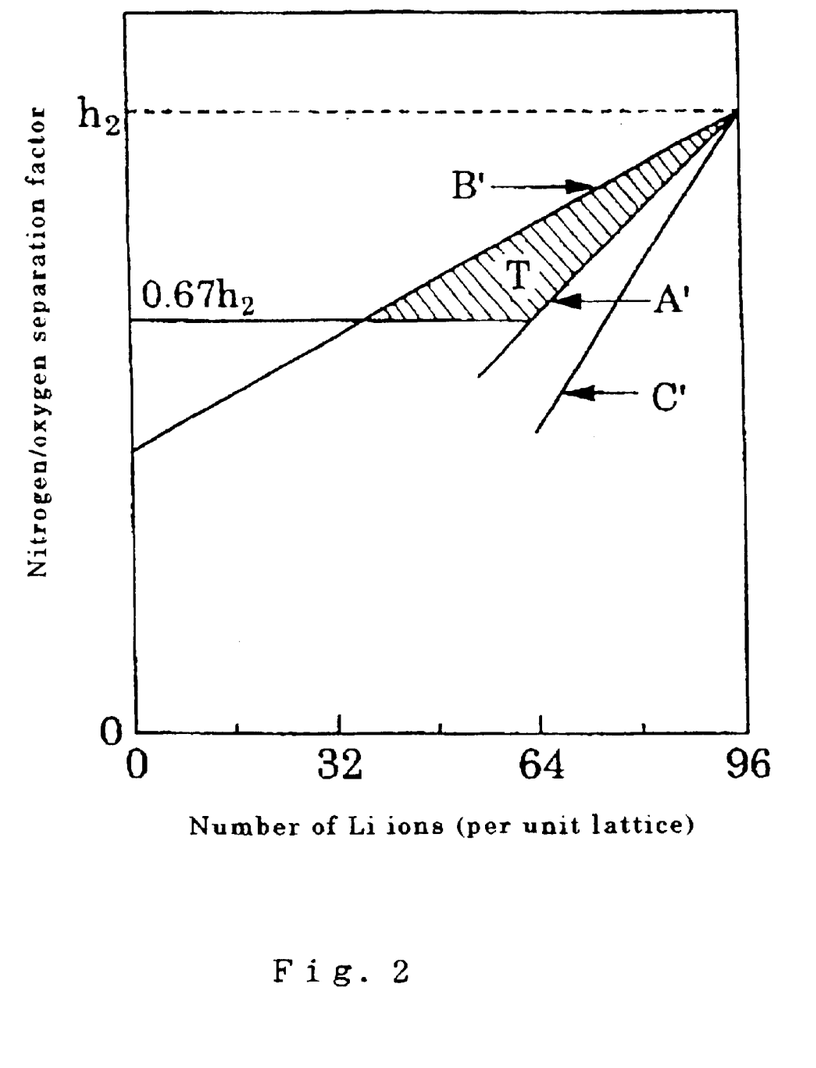
FIG. 2 is a diagram illustrating a nitrogen adsorption characteristic of the nitrogen selective adsorbent according to the present invention.

In FIG. 2, the application of the above expression (2) is preferably limited to the range of y$_1$=0.67 h$_2$ to h$_2$ for the same reason as described with reference to FIG. 1.

In the expression (2), the ranges of the constants employed when the zeolite is used in a powder form and when the zeolite is used in a pellet form are different from each other as in the expression (1). The constant d' is from −4.16 to −2.96 when the zeolite is used in a power form, and is from −5.06 to −3.06 when the zeolite is used in a pellet form (with an A-zeolite content of smaller than 10%).

The inventive nitrogen selective adsorbent having the aforesaid characteristics is advantageously employed for selective adsorptive separation of nitrogen from air, particularly for a PSA air separation method. The nitrogen selective adsorbent is sufficiently excellent in nitrogen adsorption capacity and nitrogen-oxygen separation characteristic even with a lower lithium ion association ratio. Therefore, oxygen or nitrogen can efficiently be produced at lower costs with the use of the inventive nitrogen selective adsorbent.

Further, a polar gas component in a gas mixture containing two or more gas components can selectively be adsorbed on the adsorbent, so that a non-polar gas component can efficiently be produced with the use of the adsorbent. Examples of the polar gas component include CO, $CO_2$ and water, and examples of the non-polar or less polar gas component include oxygen, argon, hydrogen and helium.

Next, an explanation will be given to examples and comparative examples.

EXAMPLE 1

Granules (pellets) of a Na$^+$-LSX (SiO$_2$/Al$_2$O$_3$ ratio=2.0) were prepared by the aforesaid production method. Then, four kinds of samples (Li$^+$.H$^+$.Na$^+$-LSX) having different exchange cation ratios were prepared by ion-exchanging the Na$^+$-LSX with ammonium ions and then with lithium ions. The ammonium ion exchange was achieved by immersing the LSX granules in a 2N ammonium nitrate aqueous solution having a mother solution ratio of 25 at 80° C. for two hours and repeating this operation twice. Then, the granules subjected to the ammonium ion exchange were subjected to the lithium ion exchange in a wet state without drying. The lithium ion exchange was achieved by treating the granules with a 1N lithium nitrate aqueous solution adjusted at pH9.0 at 100° C. for two hours. At this time, the lithium nitrate aqueous solution was used in an amount such that the number of moles of lithium ions was one to five times the number of moles of Al in the zeolite. The flow-type ion exchange method is preferred for the ion exchange as described above, but the batch ion exchange method was herein employed on a laboratory scale, by which the ion exchange operation was repeated several times. The contents of cations in each of the samples thus prepared were measured by the inductively coupling plasma (ICP) emission spectroscopy. The results (molar ratios of the cations to Al) are shown in Table 1. The effective nitrogen adsorption amount of each of the samples (a difference between the amount of nitrogen adsorbed at 760 Torrs and the amount of nitrogen adsorbed at 210 Torrs) was determined, and the nitrogen-oxygen separation factor (N$_2$/O$_2$) was calculated. The results are shown in Table 2.

It is difficult to directly measure the content of protons (ammonium ions) by a chemical analysis such as ICP. Since all the cations in the zeolite are monovalent and the total number of the cations is equal to the number of Al atoms, the number of the protons was estimated as a deficiency in cations with respect to the number of the Al atoms by calculating the total number of the cations (Na$^+$ and Li$^+$).

TABLE 1

| Example 1 | Li mother solution ratio*[1] | Na/Al | Li/Al | H/Al*[3] | H/(H + Na) |
|---|---|---|---|---|---|
| 1 | 1 | 0.212 | 0.600 | 0.188 | 0.470 |
| 2 | 2 | 0.111 | 0.735 | 0.154 | 0.581 |
| 3 | 5 | 0.030 | 0.801 | 0.169 | 0.849 |
| 4 | 25*[2] | n*[4] | 0.989 | 0.013 | 1.00 |

*[1]The mother solution ratio means the ratio of the number of moles of Li* in a solution employed for the Li ion exchange to the number of moles of Al in a zeolite (this definition is the same in the following tables).
*[2]A treatment with a solution having a mother solution ratio of 5 was repeated five times (this definition is the same in the following tables).
*[3]A value estimated so that the total number of cations is equalized to the number of Al atoms (this definition is the same in the following tables).
*[4]"n" indicates that an element was not detected in an element analysis (this definition is the same in the following tables).

TABLE 2

| Example 1 | Effective nitrogen adsorption amount | Separation factor |
|---|---|---|
| 1 | 7.39 | 4.00 |
| 2 | 10.8 | 4.92 |
| 3 | 13.0 | 5.30 |
| 4 | 15.8 | 6.30 |

The above results indicate that the ratio of the number of the protons to the number of the cations other than the lithium ions, the effective nitrogen adsorption amount and the separation factor increase as the lithium ion exchange ratio increases.

EXAMPLE 2

With the use of LSX pellets prepared in the same manner as in Example 1, samples whose cations other than lithuim ions were all exchanged with protons were prepared by performing almost 100% lithium ion exchange and then ammonium ion exchange. The respective ion exchange operations were performed in the same manner as in Example 1. At this time, the amount of the ammonium nitrate aqueous solution to be used for the ammonium ion exchange was variously set for preparation of ten kinds of samples ($Li^+.H^+$-LSX) having different lithium ion exchange ratios. The contents of the cations in each of the samples were measured in the same manner as in Example 1 by the ICP emission spectroscopy. The results (molar ratios of the cations to Al) are shown in Table 3. Further, the effective nitrogen adsorption amount and separation factor of each of the samples were determined in the same manner as in Example 1, and the results are shown in Table 4.

TABLE 3

| Example 2 | Na/Al | Li/Al | H/Al*[3] |
|---|---|---|---|
| 1 | n*[4] | 0.14 | 0.86 |
| 2 | n | 0.40 | 0.60 |
| 3 | n | 0.47 | 0.53 |
| 4 | n | 0.48 | 0.52 |
| 5 | n | 0.50 | 0.50 |
| 6 | n | 0.55 | 0.45 |
| 7 | n | 0.61 | 0.39 |
| 8 | n | 0.71 | 0.29 |
| 9 | n | 0.91 | 0.09 |
| 10 | n | 0.99 | 0.01 |

TABLE 4

| Example 2 | Effective nitrogen adsorption amount | Separation factor |
|---|---|---|
| 1 | 0.989 | 2.79 |
| 2 | 6.22 | 3.82 |
| 3 | 8.38 | 4.23 |
| 4 | 8.64 | 4.32 |
| 5 | 9.34 | 4.22 |
| 6 | 9.78 | 4.72 |
| 7 | 10.2 | 4.57 |
| 8 | 11.9 | 5.24 |
| 9 | 15.1 | 6.01 |
| 10 | 16.0 | 6.31 |

COMPARATIVE EXAMPLES 1 and 2

In Comparative Example 1, LSX pellets prepared in the same manner as in Example 1 were directly ion-exchanged with lithium ions for preparation of six kinds of samples ($Li^-.Na^+.K^+$-LSX) having different lithium ion exchange ratios. In Comparative Example 2, the aforesaid LSX pellets were first ion-exchanged with sodium ions for completely removing potassium ions, and then ion-exchanged with lithium ions. Thus, six kinds of samples ($Li^-.Na^+$-LSX) having different lithium ion exchange ratios were prepared. The measurement was performed on these samples in the same manner as in Example 1, and the results are shown in Tables 5 and 6. As in Example 1, the effective nitrogen adsorption amount and separation factor of each of the samples were determined, and the results are shown in Tables 7 and 8.

TABLE 5

| Comparative Example 1 | Li mother Solution ratio*[1] | Na/Al | K/Al | Li/Al |
|---|---|---|---|---|
| 1 | 0 | 0.81 | 0.19 | — |
| 2 | 0.7 | 0.67 | 0.05 | 0.28 |
| 3 | 2 | 0.43 | 0.02 | 0.55 |
| 4 | 5 | 0.28 | — | 0.72 |
| 5 | 20*[5] | 0.12 | — | 0.88 |
| 6 | 35*[6] | 0.01 | — | 0.99 |

*[5]A treatment with a solution having a mother solution ratio of 5 was reported four times (this definition is the same in the following tables).
*[6]A treatment with a solution having a mother solution ratio of 5 was repeated seven times (this definition is the same in the following tables).

TABLE 6

| Comparative Example 1 | Effective nitrogen adsorption amount | Separation factor |
|---|---|---|
| 1 | 4.10 | 2.40 |
| 2 | 3.85 | 2.49 |
| 3 | 4.37 | 2.61 |
| 4 | 5.95 | 3.57 |
| 5 | 10.9 | 5.15 |
| 6 | 15.8 | 6.31 |

TABLE 7

| Comparative Example 2 | Li mother solution ratio*[1] | Na/Al | K/Al | Li/Al |
|---|---|---|---|---|
| 1 | 0 | 1.0 | n*[4] | — |
| 2 | 0.7 | 0.65 | n | 0.35 |
| 3 | 2 | 0.45 | n | 0.55 |
| 4 | 5 | 0.29 | n | 0.71 |
| 5 | 20*[5] | 0.24 | n | 0.76 |
| 6 | 35*[6] | 0.03 | n | 0.97 |

TABLE 8

| Comparative Example 2 | Effective nitrogen adsorption amount | Separation factor |
|---|---|---|
| 1 | 6.89 | 2.66 |
| 2 | 5.91 | 2.60 |
| 3 | 6.17 | 2.78 |
| 4 | 6.49 | 3.17 |
| 5 | 8.60 | 3.91 |
| 6 | 15.3 | 6.09 |

EXAMPLE 3 AND COMPARATIVE EXAMPLE 3

The LSX pellets were employed for the preparation of the samples of Examples 1 anf 2 and Comparative Examples 1 and 2, so that A-type crystals were partly contained in the samples in addition to faujasite X-type crystals as previously described. Since the A-type crystals are smaller in pore diameter and pore volume than the faujasite X-type crystals, the nitrogen adsorption amount is reduced. Further, reduction adsorption capacity is predicted because of the presence of an amorphous substance with difficulty in preparation of a binderless product. For this reason, the synthesized LSX crystalline powder was not granulated, but tableted to avoid the reduction in adsorption capacity. Then, the resulting LSX tablets were subjected to the ion exchange in the same manner as in Example 2 and Comparative Example 1, whereby plural kinds of samples having different lithium ion exchange ratios were prepared. The measurement was performed on these samples in the same manner as in Example 1, and the results are shown in Tables 9 and 11. The effective nitrogen adsorption amount and separation factor of each of the samples were determined, and the results are shown in Tables 10 and 12.

TABLE 9

| Example 3 | Na/Al | Li/Al | H/Al*3 |
|---|---|---|---|
| 1 | n*4 | 0.50 | 0.50 |
| 2 | n | 0.65 | 0.35 |
| 3 | n | 0.80 | 0.20 |
| 4 | n | 0.99 | 0.01 |

TABLE 10

| Example 3 | Effective nitrogen adsorption amount | Separation factor |
|---|---|---|
| 1 | 11.9 | 5.15 |
| 2 | 13.5 | 5.45 |
| 3 | 15.7 | 6.25 |
| 4 | 18.6 | 6.95 |

TABLE 11

| Comparative Example 3 | Na/Al | K/Al | Li/Al |
|---|---|---|---|
| 1 | 0.27 | n*4 | 0.73 |
| 2 | 0.15 | n | 0.85 |
| 3 | 0.01 | n | 0.99 |

TABLE 12

| Comparative Example 3 | Effective nitrogen adsorption amount | Separation factor |
|---|---|---|
| 1 | 9.49 | 4.10 |
| 2 | 12.8 | 5.45 |
| 3 | 18.5 | 6.95 |

EXAMPLES 4 AND 5

LSX pellets prepared in the same manner as in Example 1 were subjected to ammonium ion exchange and lithium ion exchange in this order under various ion exchanging conditions, whereby plural kinds of samples were prepared which contained protons and sodium ions in addition to lithium ions. Of these samples, samples of Example 4 contained protons in a ratio ($H^+/(H^++Na^+)$) of 0.2 with respect to cations other than lithium ions, and samples of Example 5 contained protons in a $H^+/(H^++Na^+)$ ratio of 0.6.

Figure 3:
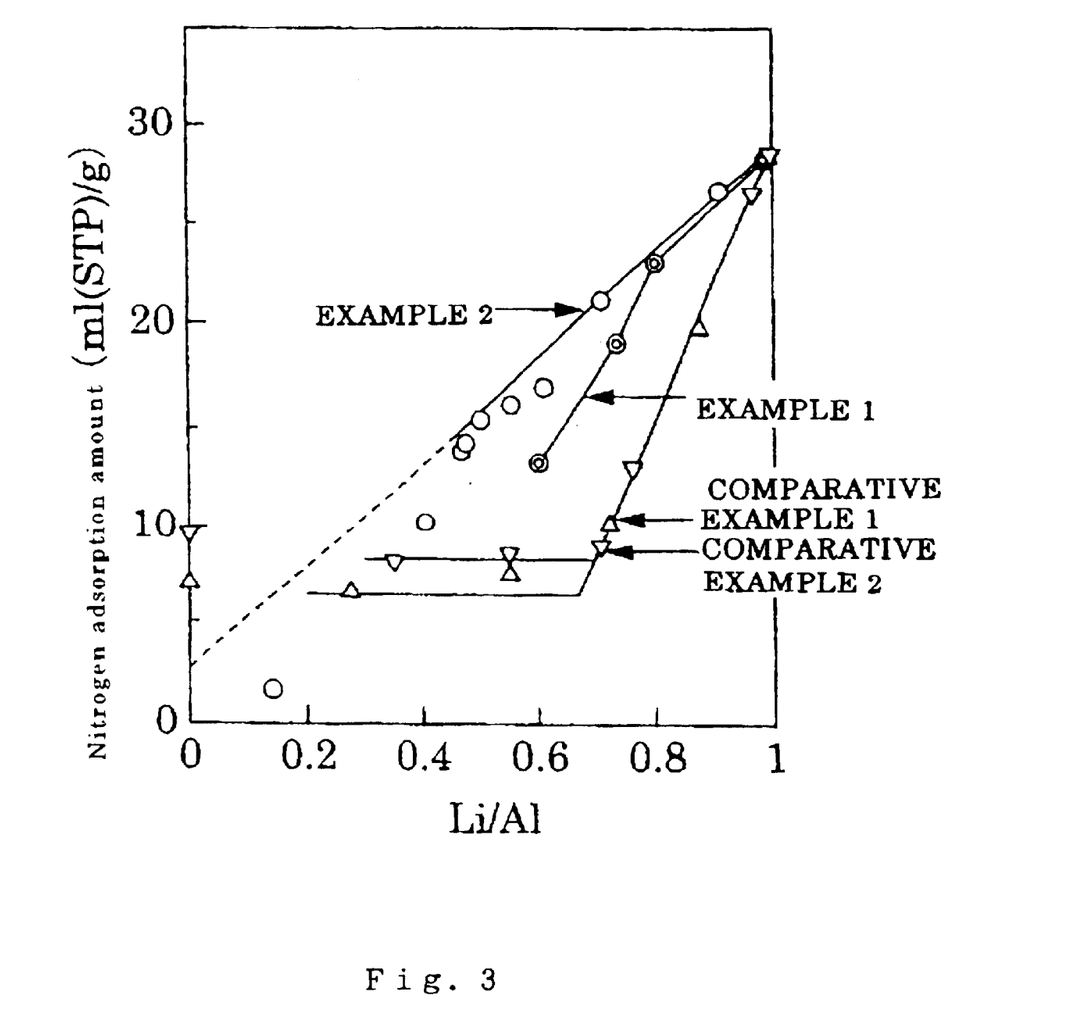
FIG. 3 is a diagram illustrating nitrogen adsorption characteristics of adsorbents of examples 1 and 2 and comparative examples 1 and 2.
Figure 4:
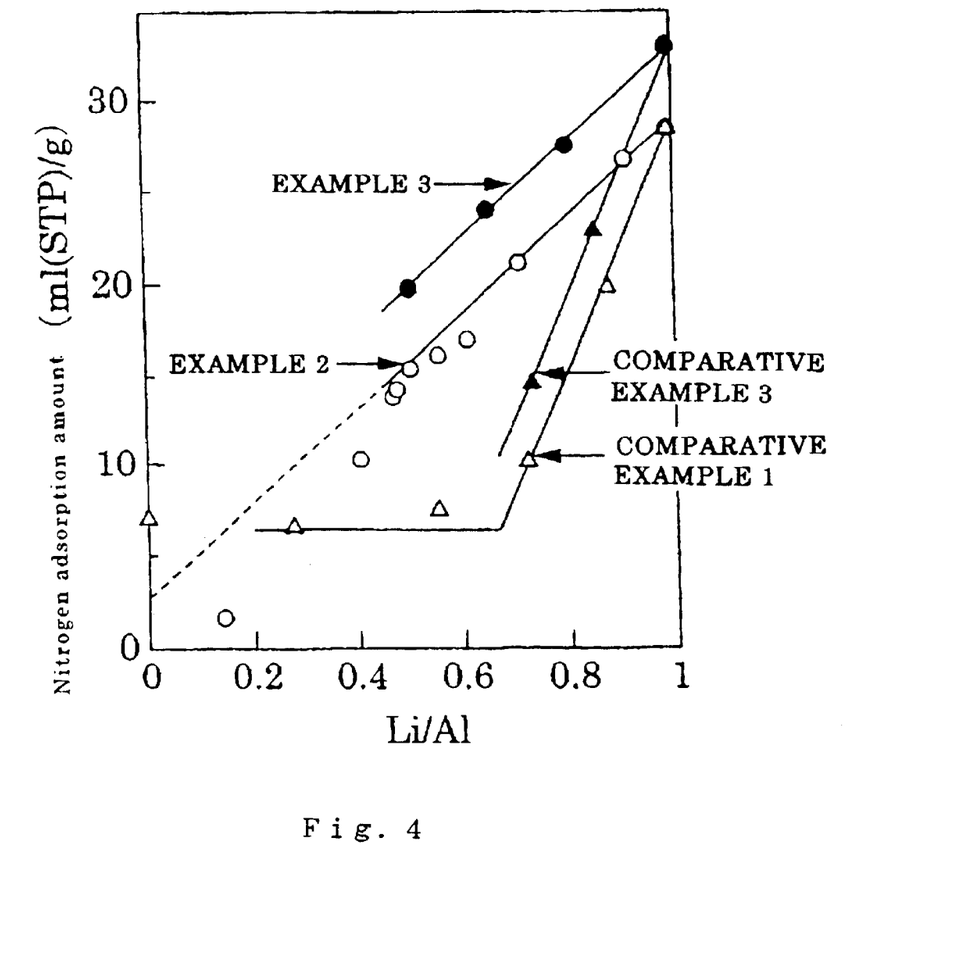
FIG. 4 is a diagram illustrating nitrogen adsorption characteristics of adsorbents of examples 2 and 3 and comparative examples 1 and 3.
Figure 5:
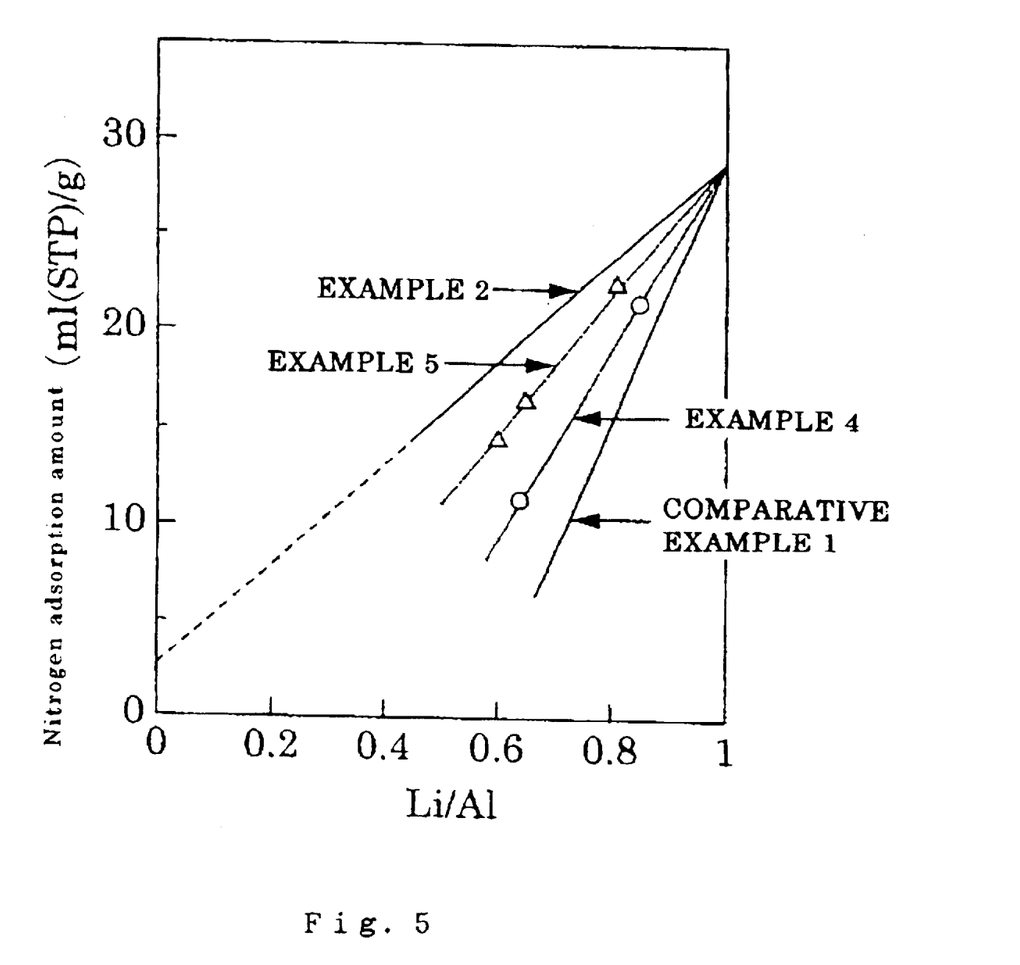
FIG. 5 is a diagram illustrating nitrogen adsorption characteristics of adsorbents of examples 2, 4 and 5 and a comparative example 1.

The samples of the examples and the comparative examples thus prepared were heated at 400° C. in vacuo at a pressure of not higher than $10^{-2}$ Torrs over night for removal of water adsorbed thereon, and nitrogen adsorption isotherms for these samples were determined at 20° C. correlation graphs were prepared with the nitrogen adsorption amount at 760 Torrs and the molar ratio of lithium ions to Al being plotted as ordinate and abscissa, respectively. These graphs are shown in FIGS. 3 to 5. Further, correlation graphs for the respective samples were prepared with the previously determined nitrogen-oxygen separation factor ($N_2/O_2$) and the molar ratio of lithium ions to Al being plotted as ordinate and abscissa, respectively. These graphs are shown in FIGS. 6 to 8.

Figure 6:
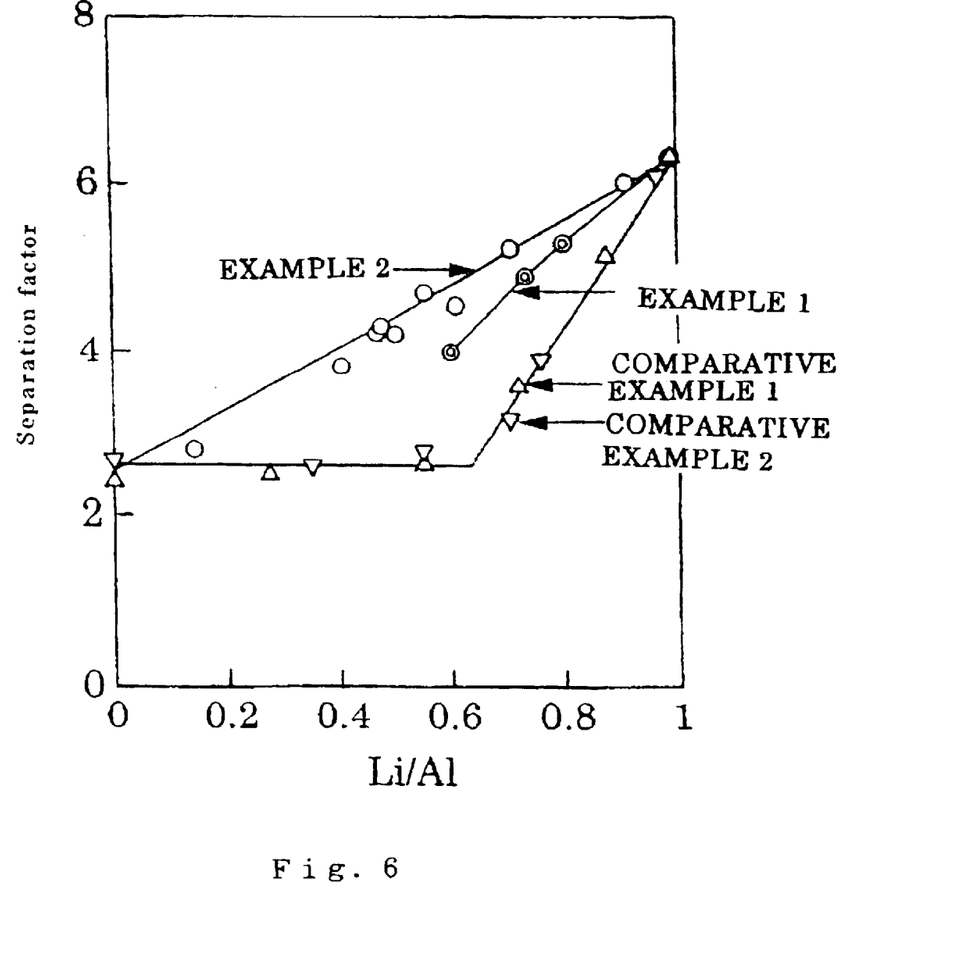
FIG. 6 is a diagram illustrating nitrogen adsorption characteristics of adsorbents of examples 1 and 2 and comparative examples 1 and 2.

As can be understood from FIGS. 3 and 6, the nitrogen adsorption amount and the separation factor in Example 1 ($Li^+.H^+.Na^+$-LSX) become closer to those in Example 2 ($Li^+.Na^+$-LSX) as the ratio of the protons to the cations other than the lithium ions increases. In the case of Comparative Examples 1 and 2, the nitrogen adsorption amount and the separation factor do not increase until the lithium ion exchange ratio reaches about 2/3. In the case of Examples 1 and 2 in which the samples were prepared from the ammonium ion-associated zeolite, on the other hand, the nitrogen adsorption amount starts increasing at a low lithium ion exchange ratio. This is inconsistent with the statement (Literature 5) that, at the initial stage of the lithium ion exchange, lithium ions are introduced preferentially onto SI' sites and SII sites and no increase is observed in the adsorption capacity and, after introduction of lithium ions onto SIII sites is started, the adsorption capacity is improved. This is a noteworthy phenomenon.

Figure 7:
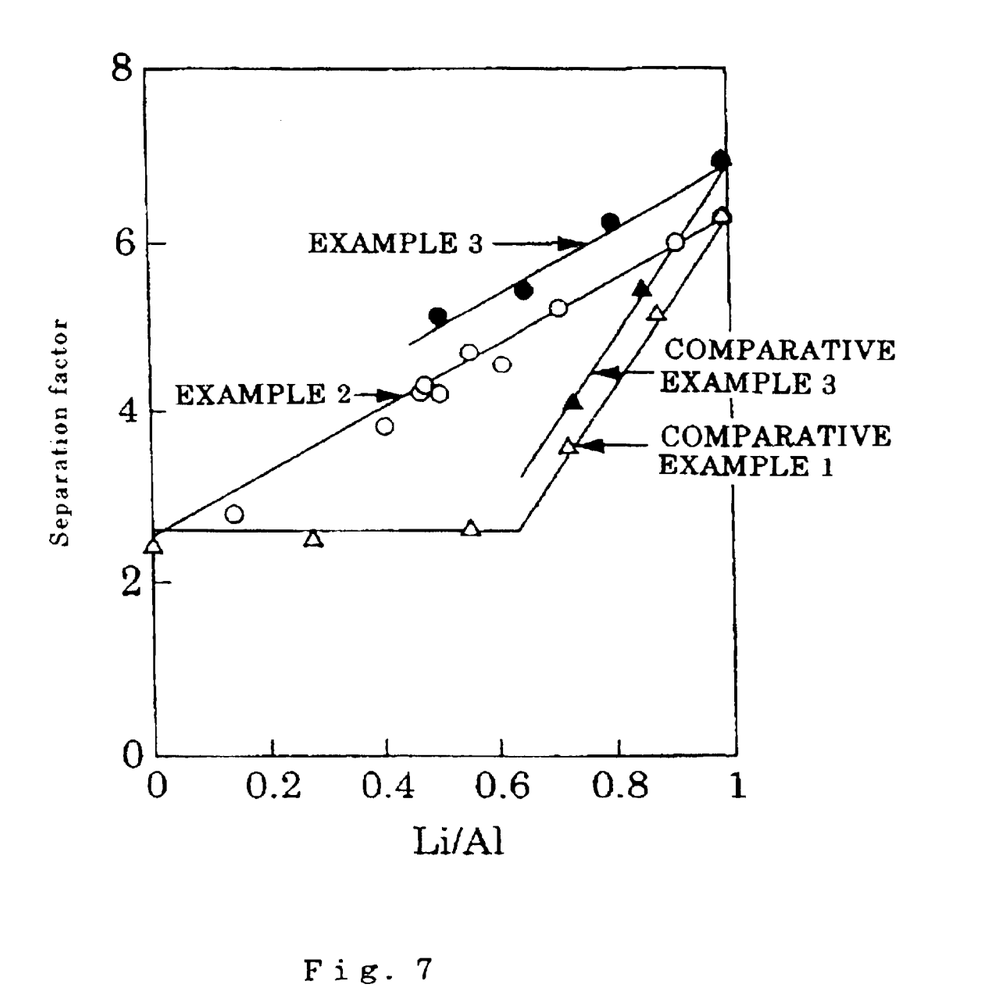
FIG. 7 is a diagram illustrating nitrogen adsorption characteristics of adsorbents of examples 2 and 3 and comparative examples 1 and 3.

As can be seen from FIGS. 4 and 7, the nitrogen adsorption amount and the separation factor in Example 3 and Comparative Example 3 in which the samples were prepared by employing the LSX tablets prepared from the LSX powder rather than employing the LSX pellets increase parallel to those in Example 3 and Comparative Example 3 in which the samples were prepared by employing the LSX pellets.

Figure 8:
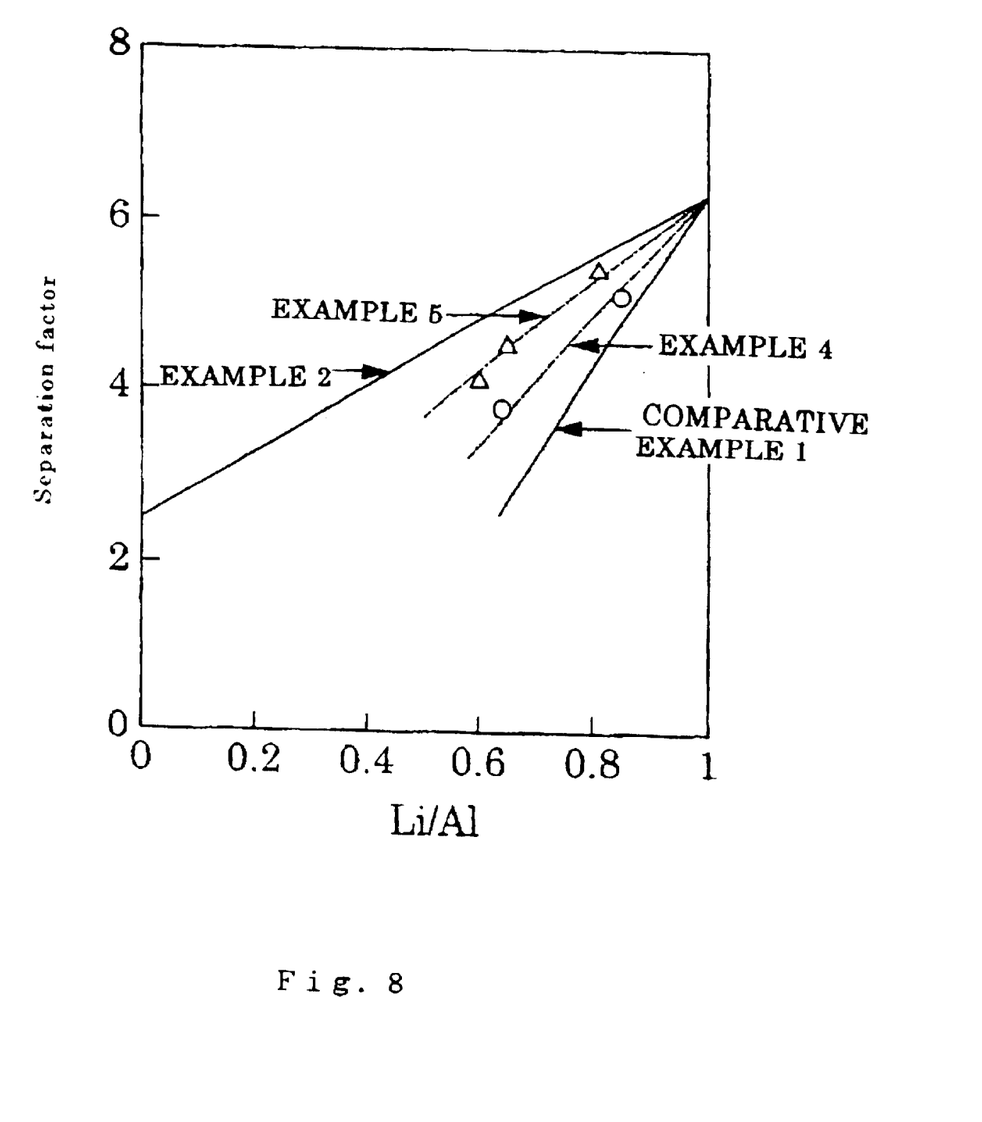
FIG. 8 is a diagram illustrating nitrogen adsorption characteristics of adsorbents of examples 2, 4 and 5 and a comparative example 1.

As can be seen from FIGS. 5 and 8, the nitrogen adsorption characteristics of the samples ($Li^+.H^+.Na^+$-LSX) of Example 5 which each had a higher ratio of the protons to the cations other than the lithium ions ($H^+/(H^++Na^+)=0.6$) are close to those of the samples ($Li^+.H^{30}$-LSX) of Example 2. On the other hand, the nitrogen adsorption characteristics of the samples of Example 4 which each had a lower ratio of the protons to the cations other than the lithium ions ($H^+/(H^++Na^+)=0.2$) are close to those of the samples ($Li^+.Na^+$-LSX) of Comparative Example 1.

An expression indicative of a relationship between the number of lithium ions per unit lattice and the number of adsorbed nitrogen molecules and an expression indicative of a relationship between the number of lithium ions per unit lattice and the separation factor ($N_2/O_2$) were determined on the basis of data of Examples 1 to 5 and Comparative Examples 1 to 3, and found to be consistent with the expressions (1) and (2).

EXAMPLE 6

The sample 3 of Example 1 (having a lithium content of 80%) was filled in a small-scale air separation apparatus employing an ordinary dual-tower PSA method, and the apparatus was operated under conventionally known predetermined operating conditions for air separation. Thus, nitrogen in air was adsorbed on the sample, whereby oxygen gas was produced with high purity in an amount drastically increased as compared with the method employing the conventional adsorbent.

INDUSTRIAL APPLICABILITY

As described above, the nitrogen selective adsorbent according to the present invention has an unprecedentedly excellent nitrogen selective adsorption capacity and, even with a lower lithium ion exchange ratio than that of the conventional adsorbent, has a nitrogen selective adsorption capacity comparable to or more excellent than that of the conventional adsorbent. Therefore, the content of expensive lithium can drastically be reduced, so that the high capacity nitrogen selective adsorbent can be produced at lower costs.

The air separation method according to the present invention is advantageous in that the air separation can efficiently be achieved at lower costs, because the aforesaid specific nitrogen selective adsorbent is employed which has a sufficiently excellent nitrogen adsorption capacity even with a low lithium ion association ratio.

What is claimed is:

1. A nitrogen selective adsorbent comprising a zeolite of a faujasite crystalline structure containing lithium ions and at least one type of cations selected from ammonium ions and protons as essential cations, the nitrogen selective adsorbent having a nitrogen adsorption characteristic represented by the following expression (1) at 760 Torrs at 20° C.:

$$y_1 = ax + b \quad (1)$$

wherein $y_1$ is the amount of adsorbed nitrogen per unit lattice of a zeolite crystal, x is the number of associated $Li^+$ ions per unit lattice of the zeolite crystal, a is a variable calculated from the following equation:

$a = a' - 0.2 \times \sqrt{z}$ (wherein $a'$ is 0.30 to 0.40), b is a variable calculated from the following equation:

$b = b' + 19.2 \times \sqrt{z}$ (wherein $b'$ is −19.6 to −15.1), and $$z \text{ is } z = \frac{\text{Number of moles of } H^+}{\text{Total number of moles of cations other than } Li^+}$$

(wherein z is 0.3 to 1.0).

2. A nitrogen selective adsorbent as set forth in claim 1, which has a nitrogen-oxygen separation characteristic represented by the following expression (2) at 760 Torrs at 20° C.:

$$y_1 = cx + d \quad (2)$$

wherein $y_2$ is a factor indicative of a nitrogen-oxygen separation efficiency and calculated from the following equation on the basis of measurement of adsorption of nitrogen and oxygen at 760 Torrs at 20° C.:

$$y_2 = \frac{N_{N2} \times Y_{O2}}{N_{O2} \times Y_{N2}}$$

(wherein $N_{N2}$ is the amount of $N_2$ adsorbed at a partial pressure (608 Torrs) of nitrogen in air, $N_{O2}$ is the amount of $O_2$ adsorbed at a partial pressure (152 Torrs) of oxygen in air, $Y_{N3}$ is a molar fraction (0.8) of nitrogen in air, and $Y_{O2}$ is a molar fraction (0.2) of oxygen in air), x is the number of associated $Li^+$ ions per unit lattice of the zeolite crystal, c is a variable calculated from the following equation:

$c = c' - 0.0071 \times \sqrt{z}$ (wherein $c'$ is 0.105 to 0.115), d is a variable calculated from the following equation:

$d = d' + 6.816 \times \sqrt{z}$ (wherein $d'$ is −5.06 to −2.96), and $$z \text{ is } z = \frac{\text{Number of moles of } H^+}{\text{Total number of moles of cations other than } Li^+}$$

(wherein z is 0.3 to 1.0).

3. An air separation method for separating nitrogen and oxygen the method comprising: bringing air into contact a nitrogen selective adsorbent as recited in claim 2; and selectively adsorbing nitrogen in the air on the adsorbent.

4. An air separation method for separating nitrogen and oxygen, the method comprising: bringing air into contact with a nitrogen selective adsorbent as recited in claim 1; and selectively adsorbing nitrogen in the air on the adsorbent.

* * * * *